B. W. FELTHOUSEN.
Steam-Trap.
No. 226,228. Patented April 6, 1880.
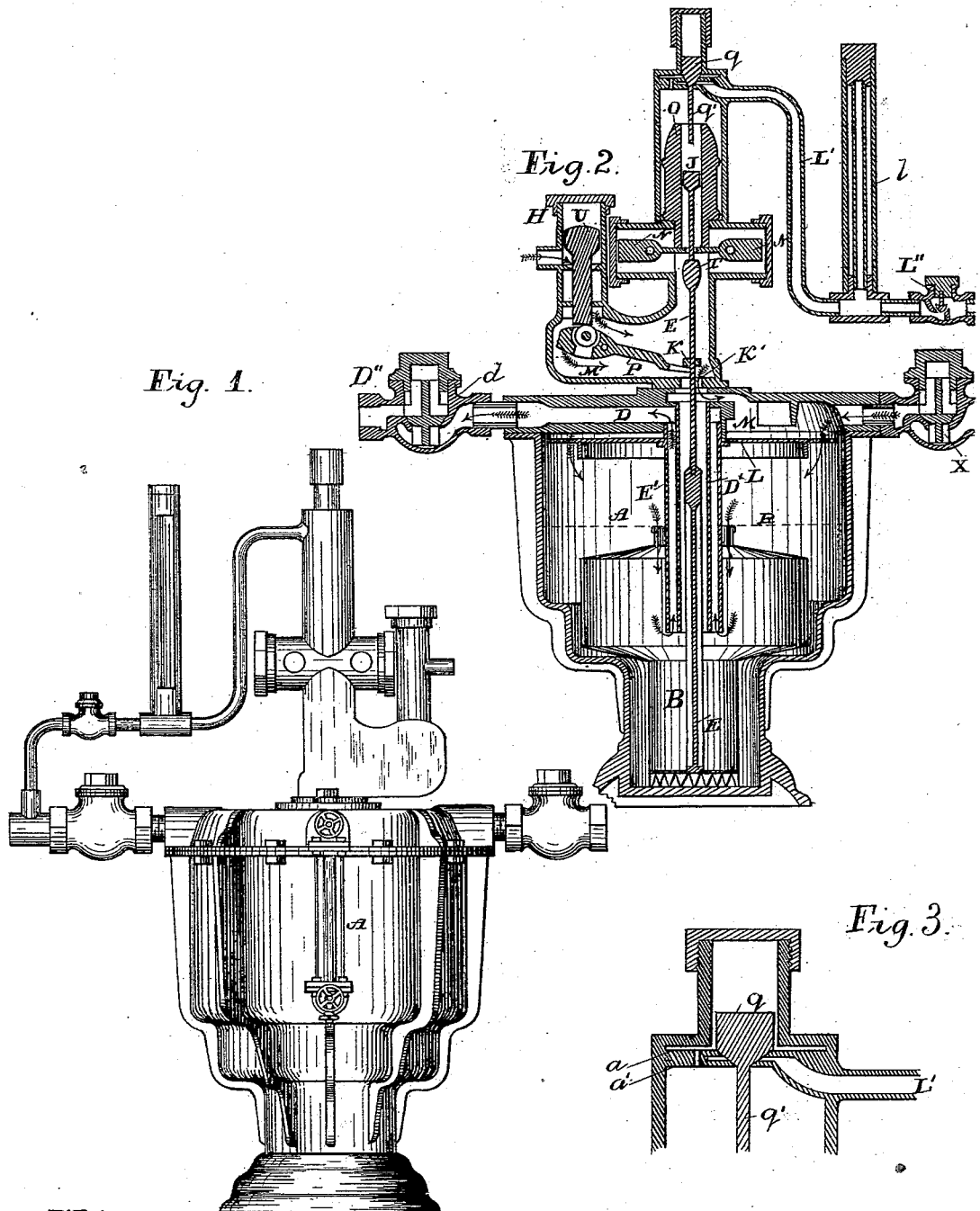

UNITED STATES PATENT OFFICE.

BARRENT W. FELTHOUSEN, OF MILWAUKEE, WISCONSIN.

STEAM-TRAP.

SPECIFICATION forming part of Letters Patent No. 226,228, dated April 6, 1880.

Application filed September 9, 1879.

*To all whom it may concern:*

Be it known that I, BARRENT W. FELTHOUSEN, of Milwaukee, in the county of Milwaukee, and in the State of Wisconsin, have invented certain new and useful Improvements in Steam-Traps; and I do hereby declare that the following is a full, clear, and exact description thereof.

My invention relates to improvements in steam-traps; and it consists in the device hereinafter fully described.

In the drawings, Figure 1 is a side view, and Fig. 2 a central section, of my device.

A is the trap, which should stand at an elevation of thirty inches or more above the level of the top of the boiler, with which it is connected by pipes leading into valves D″ and U. Another pipe, leading from valve X, connects it with a vessel for receiving the water from the condensation of the steam in the pipes, called a "drip-chamber." This vessel is generally placed below the floor, and always below the lowest pipes.

B is a float, to which is attached a valve-rod, E. This float slides upon a tube, D′, which in turn surrounds another tube, E′, depending from the top of the trap, and an annular space is left between the mouth of the float and tube D′, for a purpose to be explained farther on. The tube E′ leads into an outlet-tube, D, and arranged about it is a foraminous plate, L.

The rod E, projecting up beyond the top of the trap proper, is provided with a nut, K, for operating the lever P of valve U. Farther up this rod E is provided with a shouldered enlargement, T, for opposing two retainers, N N, which are held down by a weight, O. Still farther up this rod terminates in a head, J, which, at a certain stage in the operation of the trap, serves to open a valve, *q*, by contact with its stem *q′*, which depends in the hollow weight O. The valve *q* has a seat in the top of the dome, which permits the steam to surround it on all sides, and leading from this valve is a pipe, L′, which communicates with the pipe leading from the valve X to the condensed-steam vessel, and is provided with a valve, L″, opening out from the trap. I generally provide pipe L″ with a thermostatic air-valve, as shown.

The condensed steam from the coils first enters a drip-chamber situated below the lowest level of the coils, and which is connected with the trap by a pipe leading to the inlet-valve X. The water entering the trap through the valve X, and falling in a shower from the plate L, condenses the steam and causes a vacuum, which induces a flow of water from the drip-chamber, and leaves it perfectly dry. As the water flows into the trap it causes the float B to rise up until it comes in contact with the plate L, where it remains until the trap and float are filled with water, when the latter sinks to the bottom of the former.

On its way down the float carries with it the rod E, which is provided with a nut, K, enlargement T, and head J, and the nut K, coming in contact with the long arm of the lever P, carries it down with it, and throwing its short arm into contact with the stem of valve U raises the latter from its seat and allows the steam from the boiler to rush into the trap through the opening K′ and down upon the water which has accumulated in the trap. The steam continues to flow until the pressure in the trap is equal to that in the boiler.

The inlet-valve X being closed, the steam-pressure on the water in the trap drives the water in the direction indicated by the arrows, down into the float, through the tubes E′ and D′ and valve *d*, into the pipe which leads to the bottom of the boiler, leaving in the trap only enough water to fill it to the dotted line R.

Now, as the water is forced out of the float, it is buoyed up by the water remaining in the trap, carrying with it the rod E, which in its ascension is retarded by the contact of the enlargement T with the detents N N, which are held down by the weight O until the float is almost empty, when it lifts the detents and weight O, which it suddenly enters, and, passing up through it at a jump, strikes the stem of the valve *q* and opens it to permit a rush of steam to the drip-chamber. This action also suddenly releases the lever P and allows the valve U to drop to its seat before the opening of valve *q*. The steam is now passing from the trap into the drip-chamber, and as soon as the pressure therein is equal to that in the trap the water will begin to trickle down upon the plate L from the inlet X. Now the float B and trap are empty, and the steam-valve U and outlet-valve are closed, and the trap is ready to perform its work automatically with the full pressure of steam from the boiler at the inlet of the coil. After the first shower from drip-chamber, the vacuum which is formed in trap A compels the water to flow into it with great rapidity from the drip-chamber and frees the coils from all condensed steam. The water thus collected in the trap is very pure, and is forced back into the boiler at a temperature bordering on that of steam. It is absolutely indispensable that the air in the trap be expelled every time the steam is turned on afresh, and I therefore provide a thermostatic air-valve on the pipe L', which should be opened until the steam has driven all the air out of the trap, or I may provide a small cock on the top of the trap for allowing the escape of the air. This thermostatic valve will also take care of the air after the trap has started.

The valve-lever P is provided with a conical roller in its short arm for receiving the stem of the valve U, and at each operation serves to turn the valve and grind it tightly into its seat.

The valve q has two seats, which consist of two plates, a a', nearly approaching each other, and joined together around their edges, and through this part holes are made to allow the steam to pass to all sides of the valve and down between the plates a a', thus nicely balancing the valve, so that but a slight pressure from the rod E will be required to raise it. (See Fig. 3.)

The lower part of the float is corrugated to prevent injury from freezing.

What I claim is—

1. In a steam-trap, the tubes E' D', float B, and rod E, for operating the inlet and outlet steam-valves, all constructed as described.

2. The combination of the float, rod, detents, and weight with the lever P and its valve.

3. The combination of float, rod, detents, and weight with the valve q, all constructed as described, and for the purpose specified.

4. The combination of outlet-pipe L' with inlet from the drip-chamber, float, foraminous plate, tubes E' and D', and outlet D to boiler.

5. The combination of a float and rod with detents, which are held down by a weight until an enlargement extending from the stem of the float has passed beyond them for the purpose of giving a sudden action, by which the closing of valve U is followed in quick succession by the opening of valve q, as set forth.

In testimony that I claim the foregoing I have hereunto set my hand this 6th day of September, 1879.

BARRENT W. FELTHOUSEN.

Witnesses:
STANLEY S. STOUT,
E. H. BOTTUM.